(12) United States Patent
Stuart

(10) Patent No.: US 10,657,844 B2
(45) Date of Patent: May 19, 2020

(54) ATOM-MODELS CONSISTING OF A CENTRAL BODY ATTACHED TO ORIENTABLE MAGNETS

(71) Applicant: Ian Douglas Stuart, Paddington (AU)

(72) Inventor: Ian Douglas Stuart, Paddington (AU)

( * ) Notice: Subject to any disclaimer, the term of this patent is extended or adjusted under 35 U.S.C. 154(b) by 173 days.

(21) Appl. No.: 15/623,418

(22) Filed: Jun. 15, 2017

(65) Prior Publication Data

US 2018/0218644 A1 Aug. 2, 2018

(51) Int. Cl.
*G09B 23/24* (2006.01)
*G09B 23/20* (2006.01)
*G09B 23/26* (2006.01)

(52) U.S. Cl.
CPC ............ *G09B 23/24* (2013.01); *G09B 23/20* (2013.01); *G09B 23/26* (2013.01)

(58) Field of Classification Search
CPC ......... G09B 23/24; G09B 23/20; G09B 23/26
See application file for complete search history.

(56) References Cited

U.S. PATENT DOCUMENTS

| | | | | |
|---|---|---|---|---|
| 1,851,159 A * | 3/1932 | Dodge | ............ | G09B 23/26 434/278 |
| 3,085,407 A * | 4/1963 | Tomlinson | ............ | H02K 49/108 464/29 |
| 3,230,643 A * | 1/1966 | Mathus | ............ | G09B 23/26 434/278 |
| 4,030,209 A * | 6/1977 | Dreiding | ............ | G09B 23/26 434/278 |
| 6,846,216 B1 * | 1/2005 | Balanchi | ............ | A63H 33/046 273/157 R |
| 10,349,982 B2 * | 7/2019 | Culbert | ............ | A61B 17/7071 |
| 2005/0118926 A1 * | 6/2005 | Roger | ............ | A63H 33/046 446/137 |
| 2008/0108275 A1 * | 5/2008 | Holman | ............ | A63H 33/046 446/129 |
| 2009/0015361 A1 * | 1/2009 | Tremblay | ............ | A63H 33/046 335/285 |

(Continued)

FOREIGN PATENT DOCUMENTS

AU 2017200688 8/2017

OTHER PUBLICATIONS

Happy atoms: a molecular chemistry set (https://www.youtube.com/watch?v=vS0XzzPI3iU) posted Dec. 1, 2015.*

*Primary Examiner* — Kevin R Kruer
(74) *Attorney, Agent, or Firm* — Ingenium Patents LLC; Peter R. Kramer

(57) ABSTRACT

Educational atom models which are attached to a plurality of filaments, to which each end is attached a self-orienting magnet. The magnet is comprised of one magnet or a plurality of magnets, such that the assembly can orient to align, attract and bond to a magnet attached to the end of another filament. The atom models can mimic chemical bonds when a magnet assembly from one atom model orients, attracts and bonds to a magnet from a different atom model. The bonding between magnets more accurately mimics the formation of chemical bonds in terms of force, energy, bonding-electron origin, speed, spontaneity, and atoms' ability to form double and triple bonds. The models are educationally engaging resulting in better learning outcomes.

2 Claims, 5 Drawing Sheets

(56) References Cited

U.S. PATENT DOCUMENTS

| | | | |
|---|---|---|---|
| 2009/0197500 A1* | 8/2009 | Song | A63H 33/046 |
| | | | 446/92 |
| 2012/0270464 A1* | 10/2012 | Lee | A63H 33/046 |
| | | | 446/92 |
| 2013/0267145 A1* | 10/2013 | Rosen | A63H 33/046 |
| | | | 446/92 |
| 2014/0213139 A1* | 7/2014 | Ferguson | A63H 33/046 |
| | | | 446/92 |
| 2014/0302741 A1* | 10/2014 | Whittaker | A63H 33/046 |
| | | | 446/92 |
| 2014/0364913 A1* | 12/2014 | Culbert | A61B 17/7016 |
| | | | 606/258 |
| 2014/0364915 A1* | 12/2014 | Culbert | A61B 17/7016 |
| | | | 606/265 |
| 2015/0065007 A1* | 3/2015 | Klepper | A63H 33/046 |
| | | | 446/92 |
| 2016/0199749 A1* | 7/2016 | Whittaker | H01F 7/0252 |
| | | | 434/278 |
| 2018/0056206 A1* | 3/2018 | Micko | A63H 33/046 |
| 2018/0161687 A1* | 6/2018 | Naini | A63H 33/086 |
| 2018/0229144 A1* | 8/2018 | Rosen | A63H 33/046 |

* cited by examiner

ATOM-MODELS CONSISTING OF A CENTRAL BODY ATTACHED TO ORIENTABLE MAGNETS

FIELD OF INVENTION

This invention relates to the field of science education. More specifically the invention pertains to atomic models used in order to construct models of molecules.

BACKGROUND OF INVENTION

Science education has long used hands-on physical models to help students visualise how various systems work, especially if they are large scale systems such as the Solar System, or small scale systems such as atoms and molecules. The most popular atomic models used in helping students understand the formation of molecules from atoms are called ball-and-stick models. This system comprises spherically shaped balls which are connected by a plurality of separate flexible plastic connectors. The plastic connectors have lugs at each end, and fit into indents located on the surface of the atom model balls, the number of which equals the number of chemical bonds that particular atom type makes There are a number of problems associated with these current ball-and-stick type classroom models. Firstly, physical forcing of lugs into indents is slow and not pedagogically engaging. Secondly, pushing lugs into indents involves contact forces, whereas the forces involved in chemical bond formation involve electrical forces which are forces-at-a-distance. Thirdly, the energy relationships for bond breaking and bond formation is misleading, as the physical forcing required to make bonds with plastic models gives students the mistaken impression that bond formation requires energy; that is, bond formation is a forced process and therefore endothermic. Fourthly, the physical forcing of the bond formation is time-consuming and misrepresents the speed at which real bonds are formed. Fifthly, separate and loose connecting connectors gives students the impression that chemical bonds are extraneous objects used to form bonds, whereas they involve bonding electron pairs that originate within the bonding atoms themselves, usually with one bonding electron donated by each atom.

The other less popular atomic models are called space-filling models. This system comprises rigid spherically shaped balls, with the spheres possess cutout quadrants or semihemispheres that enable them to overlap and interlock to represent overlapping electrons to form bonds. Unfortunately, these models visually mask the chemical bonds between the atoms and make it difficult to see which is the original bonding electron-donor atom. Further, the shape of the non-bonded atom models is incorrectly identical to the bonded atom model sections, because the models are rigid. Finally, the inflexibility of the rigid atom models means that differently shaped atom models of the same atom type are required for use in molecules when forming single, double and triple bonds.

The present invention uses magnets instead of physical forcing thus overcoming most of the problems of the ball-and-stick models, for, like electric forces, magnetic forces are forces-at-a-distance. The forces exert instantly, spontaneous, and correctly represent the energy relationships of bond formation in which it is spontaneous and releases energy; that is, real bond formation is exothermic.

The present invention solves the limitations of the ball-and-stick system by attaching orientable magnetic assemblies onto the tips of filaments attached to each atom models, instead of physically joining the atom models with separate loose static connectors. The main problem that is solved in creating this invention is that a particular magnetic pole will only attract to opposite poles of other magnets attached to the tips of other filaments belonging to other atom models. If all exposed poles on the tips of the filaments were selected to be north, then all filament tips would repel each other; if all were chosen to be south, then all filament tips would also repel; if filaments were mixed with both north and south poles, then some combinations of filament tips would attract (north-south and south-north) whereas others would repel (north-north and south-south). No combination of such uni-polar magnetic assemblies can produce filament tips that will universally attract to all other filament tips, which is a requirement to accurately reflect chemical bond formation.

By attaching an orientable magnets onto the filament tips, they will be universally attracted to any other orientable magnets irrespective of the orientation of either. This is because the novel multi-polar design, along with the orientable housing, will always allow the magnetic assemblies to rotate into an orientation that will cause attractive forces between them to prevail. The north pole of one magnet pair will align with the south pole of a second magnet pair, and conversely the south pole of the first magnet pair will align with the north pole of the second magnet pair. One or both magnetic assemblies will rotate until this alignment occurs spontaneously. This means that every bond will attract every other bond, which accurately reflects chemical bonds behaviour. The construction issues involved in delicate magnetic strength-to-model-weight ratio, as well as attachment issues to lightweight atom model materials have also been overcome by the careful selection of construction materials.

A further advancement by this invention over ball-and-stick models is the replacement of loose connectors with permanently attached filament extensions to atom-models. This means that the relationship between the bonding atom and the bonding electron, and the fact that the bonding electron is an internal part of the bonding atoms, and that each atom contributes a bonding electron, are more correctly represented. Further again, because the filaments are firmly attached to the atom-models, they are not lost during classroom activities, which is a practical advantage.

Finally, manipulation of magnetically attracted atom-models to form a multitude of possible molecular outcomes is much more fun than sticking the atom-models together with static plastic connectors. Students only need to wave the filament tips near each other, and they spontaneously stick together. This is due to the speed and force-at-a-distance characteristics of the orientable magnetic assemblies. The invention provides not only are more accurate picture of how atoms bond to each other, but it does so in a way that is much more fun, and therefore educationally effective.

SUMMARY OF THE INVENTION

The present invention comprises a molecular construction kit for helping students understand how atoms bond together to form molecules. The kit comprises a plurality of spherical atom-models to which a plurality of filaments are attached, such that each filament tip has attached to it an orientable magnets that can attract, align and bond to an orientable magnets attached to the tip of a different filament, which is attached to a different atom-model. Multiple filaments tips from an atom-model can spontaneously bond with multiple filament tips of other atom-models, representing double and triple bonds between atoms. The fast, spontaneous, forcesat-a-distance, educationally-engaging magnetic attractions are an improvement upon the static joining of atom-models in current ball-and-stick models requiring contact forces to join atom-models into molecule-models, and the filament extensions of the atom models, rather than separate loose connectors, better identify the electron-donor atoms involved in bonding, as well as obviate the loss of the filaments in classroom activities.

DESCRIPTION OF EMBODIMENTS

Definition of Terms

The term "filament" refers to a long, thin, durable, flexible material made of nylon, nylon-coated wire, silicone, carbon fibre, carbon composite, or ceramic, or any other material that provides those properties, and which may or may not be made of a plurality of smaller threaded threads.

The term "magnetic assembly" refers to one or more magnets, which in the preferred embodiment are small N50 or N52-grade rare earth magnets, and which in the preferred embodiment are rod-shaped or solid rectangular prism-shaped, attached together in alternating sequence in such a manner that the North Pole(s) and South Pole(s) are adjacent to each other, and plane of the flat pole surfaces are at 90° to the filament axis and face towards the magnetic assembly of a different bond model. Other embodiments are not limited to the use of rod-shaped magnets of cylindrical shape wherein the length is greater than the diameter, or disc of cylindrical shape wherein the diameter is greater than the length, and may include bar-shaped, horseshoe-shaped, spherical, or ring-shaped or any other shape, and may include indentations to assist attachment to the rest of the invention. The magnetic assembly may also consist of single piece of metal that can be magnetised to create a multi-polar end. Rare earth metal spheres are examples of this type of magnet.

The term "housing" refers to an attachment means of the magnetic assembly, wherein the attachment material is made of a strong, durable material such as acrylic plastic, ABS plastic, silicone, carbon fibre, carbon composite, ceramic, wood, cellulose, or any polymeric material, or a metal such as aluminium, or any other material that secures the elements together. In some embodiments the housing encases the filament and plug combination in a manner that allows it to rotate freely about the filament axis. Other embodiments may not require a housing as the shape of the magnetic assembly could itself house the filament and plug, and serve the same function.

The term "magnetic assembly" refers to the combination of magnets and their housing.

Figure 1:
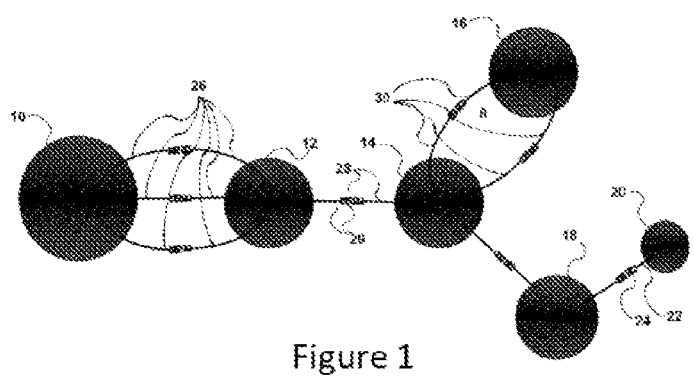
FIG. 1 is a side view that shows an overall schema of the plurality of atom-models with their corresponding plurality of attached filaments bonding together to construct an example of a molecule-model.

The term "link" refers to a combination of a filament, plug and a magnetic assembly. In FIG. 1, 28 shows a link comprising a filament and magnetic assembly connected to atom model 14. When two links are connected end-to-end so that their magnetic assembly faces are touching and attracting, they mimic a chemical bond formed between two atoms. A combination of a link and spherical atom model refers to an atomic bonding model.

This configuration in which 2 links connect end-to-end, thus connecting two atom models together, is given the term "bond model". One bond model connecting two atom models is equivalent to a "single bond model", though this distinction between a "bond model" and a "single bond model" is not usually made; two bond models connecting two respective atom models is equivalent to a "double bond model", whereas three bond models connecting two respective atom models is equivalent to a "triple bond model".

The term "atom model" refers to a colour-coded, size-coded spherical ball connected to a plurality of filaments corresponding to the valency of that atom type. In other words, the term "atom model" is inclusive of the spherical material and of the filaments with magnetically attractive tips; for example, a Carbon atom-model would consist of a black sphere with 4 links attached. The ball may be solid (uniform in composition) or hollow. In the case of the material EVA foam, it is envisaged that the ball would be solid, as the material is light-weight, whereas in the case that the material is ABS plastic, the ball would be hollow as the material is significantly denser. Each atom model type possesses a characteristic number of links. For example, Hydrogen atom models have one link, Oxygen and Sulfur have 2 links, Nitrogen atom models have 3 links and Carbon and Silicon atom models have 4 links. Because some atom types have multiple valencies, it is anticipated that future embodiments will have some atom model types with a plurality of links; for example, some Sulfur atom models may have 4 links, and yet other Sulfur atom models may have 6 links, and so on. Atom models have a characteristic colour depending on the atom type.

The term "molecule model" refers to a valid combination of atom models such that all bonding requirements of all atom model types are satisfied.

The letter "N" refers to North pole, and the letter "S" refers to south pole.

FIG. 1 illustrates some of the terms in the above paragraph. Collectively, all the objects combine to show a "molecule-model". This is just one of a plurality of valid molecule models that can be arranged using the plurality of atom models in the invention. Object 10 shows an "atom model" that represents a Phosphorous atom, with a valency of 3. Objects 12 and 14 show "atom models" that represents Carbon atoms, each with a valency of 4. Object 22 shows a "filament". Object 24 shows a "magnetic assembly". Objects 28 is comprised of a filament and a magnetic assembly, so together these form a "link". Object 28 shows a link, and together with object 29, another filament, form a "bond model", which is equivalent to a "single bond model", as described in the above paragraph. In other words, a chemical bond-model requires two links, one from each atom-model, to connect together. The elements collectively in object 26 shows 3 bond models all connected between a Phosphorous atom model and a Carbon atom model, so this represents a "triple bond model". Similarly, the elements in object 30 collectively shows a "double bond model".

FIG. 1 is a side view that shows a preferred embodiment of the invention in one of its possible assembled states, and represents one of a plurality of possible molecule models, comprised of atom-models 10, 12, 14, 16, 18, and 20. The atom-models shown in FIG. 1 are of 3 different sizes, in which atom-model 10 represents a Phosphorous atom and being the largest, and in which the atom-model 20 which represents Hydrogen and being the smallest. The atom-models that represent Carbon, 12 and 14, and the models that represent Oxygen, 16 and 20, are all of similar size, being smaller than the Phophorous atom-model, and larger than the Hydrogen atom-model. Each atom-model possesses a characteristic number of links, that cross-link to other atom models to form bond-models. Collectively this web of links, bond-models and central bodies form a molecule-model.

Figure 2:
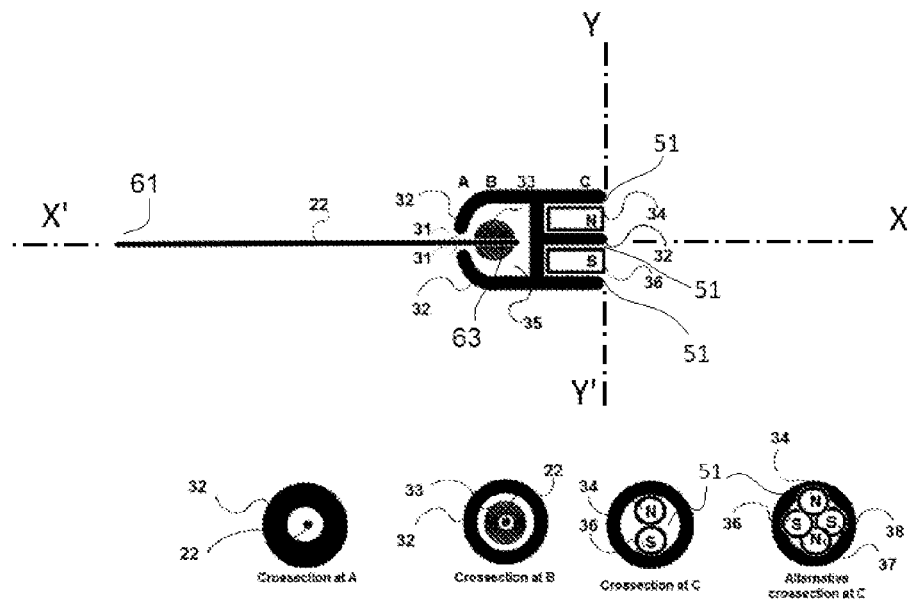
FIG. 2 is a side view close-up a preferred embodiment showing the elements that make a filament comprising a filament, plug, cavity, housing and orientable magnetic assembly. The figure also shows various cross-sectional views of the magnetic assembly at different points, and alternative multi-polar configurations.

FIG. 2 is a side view close-up a preferred embodiment showing the elements that make a filament comprising a freely orientable magnetic assembly, wherein the filament 22 passes from the outside to the inside of the housing through a small aperture 31 at the opposite end of the housing to the magnetic assembly, comprising 34 and 36, and wherein the filament is rotatably attached to a plug 33 made of a durable substance such as a polymer, or metal tube, wherein the filament is inserted through a hole inside the plug, and secured by means of a 2-part epoxy resin or other type of glue, or crimped onto the filament, respectively, wherein the plug is significantly larger than the aperture The housing has a cavity 35 between the aperture and the magnetic assembly, wherein the cavity is optimally larger than the plug. This configuration allows the magnetic assembly to rotate freely around the axis, denoted by X-X', which is perpendicular to the plane of the end face and passes through the second end of the filament and the center of the end-face. A lubricant such as powdered graphite or oil located in the cavity is contemplated. In this preferred embodiment, the housing and magnetic assembly are rigidly attached to each other, so both housing and magnetic assembly, which comprise the magnetic assembly, are free to rotate. Similarly, it should be evident that an end face also rotates about an axis, as defined above for FIGS. 3-9. First and second ends of the filament are indicated by numerals 61 and 63, respectively. Analogous filament first and second ends are shown and numbered in FIGS. 2-4, and 6-9.

FIG. 2 also shows 4 cross-sections at 90° to the points A, B and C to elucidate the configuration of the preferred embodiment. Note that the magnetic assemblies can consist of the pluralities of magnets; in one embodiment cross-section there are 2 magnets 34 and 36, creating a bi-polar tip to the magnet assembly; and in another embodiment cross-section 4 magnets, 34, 36, 38 and 40, creating a tetra-polar tip to the magnet assembly, respectively; however there could be more consisting of alternating North-South pole adjacent to each other in further embodiments. An end face 51 is formed at the opposite end of the housing in which the end face is defined by the plane Y-Y'. Another embodiment might employ a single horseshoe-shaped magnet in which both North and South pole faces are adjacent.

Figure 3:
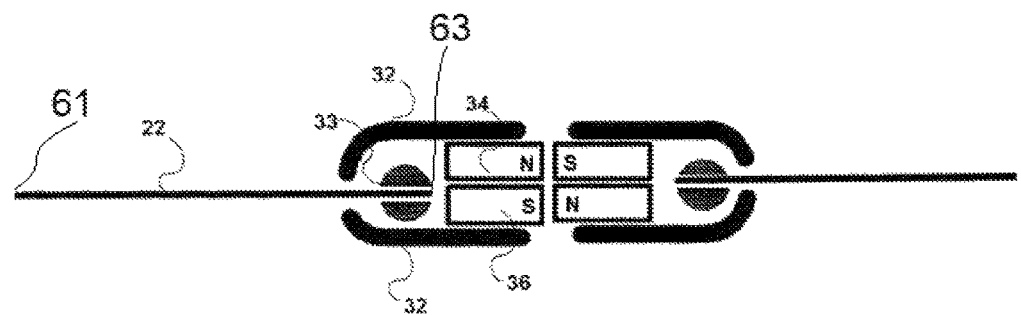
FIG. 3 shows a side view of how orientable magnets allow the magnetic assemblies to spontaneously align, attract and bond together.

FIG. 3 shows a side view of a preferred embodiment of a bond-model comprising 2 links end-to-end such that the magnet assembly faces are attracted to and stuck onto each other, thus constructing a bond-model. The 2 links are identical to each other, except that the second link is oriented at 180° to the first link so that the magnet faces attract and touch each other. Irrespective of which orientation the North-South poles are oriented when the two filaments approach each other, the orientable magnetic assemblies will spontaneously reposition themselves so that the attractive force between the North pole of first magnetic assembly and the South pole of the second magnetic assembly will align and touch, and the attractive force between the South pole of the first magnetic assembly and the North pole of the second magnetic assembly will align and touch. The net effect is that one or both magnetic assemblies will rotate so that the attractive magnetic forces will pull together and lock the two magnetic assemblies together.

Figure 4:
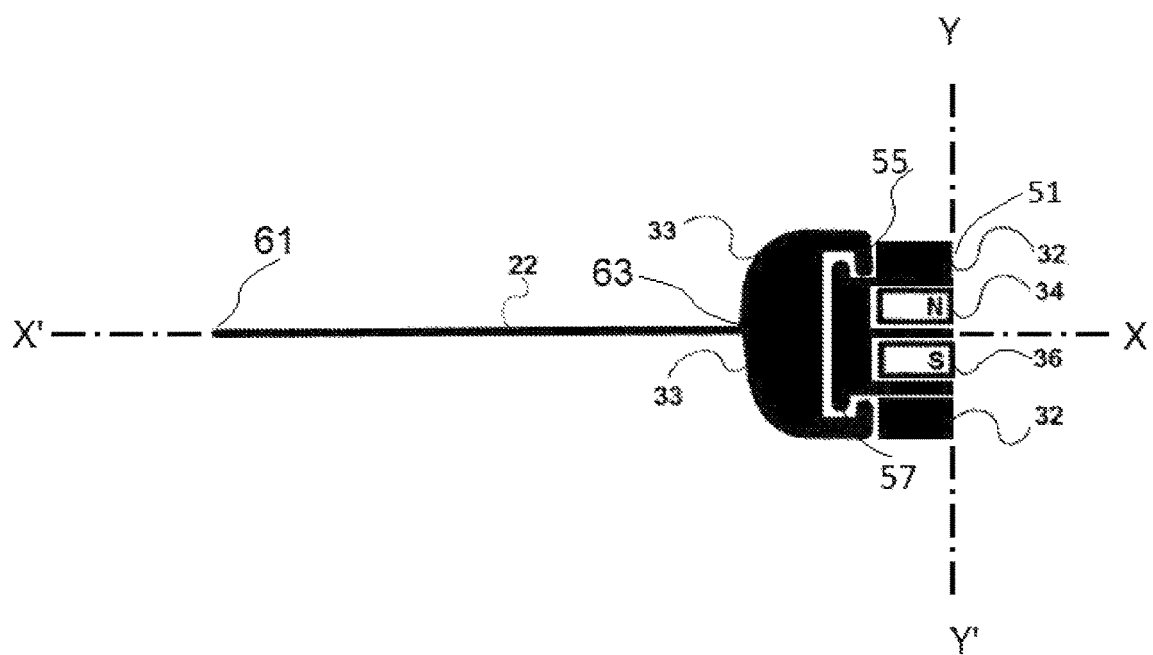
FIG. 4 shows a side view of an alternative embodiment in which the cavity is instead inside the filament's plug 33, having lip 55, into which the magnetic assembly 32, having flange 57, is inserted in order to provide its orienting means. The filament has a first end 61 and a second end 63. Note that FIGS. 1-4 and 6-9 include reference numerals for the first and second end of the filament 61 and 63, respectively. Engagement of lip and flange ensure that the magnetic assembly can freely rotate with respect to the plug while securely connected or attached to the plug. Persons of ordinary skill in the chemical arts should recognize that because the magnetic assembly can freely rotate with respect to the plug, free rotation about covalent bonds is effectively mimicked and that spontaneous attractions can occur between neighbouring magnetic assemblies in which covalent bonds are effectively mimicked. Thus, with a sphere connected to a magnetic assembly by the filament the magnetic assembly and its end-face can also rotate with respect to the sphere and therefore magnetic assembly (or its end-face) and sphere can be described as rotatably connected.

FIG. 4 shows a side view of a variation on the embodiment in FIG. 2, in which the cavity is instead located inside the plug 32, and within which the magnetic assembly 39 is free to rotate.

Figure 5:
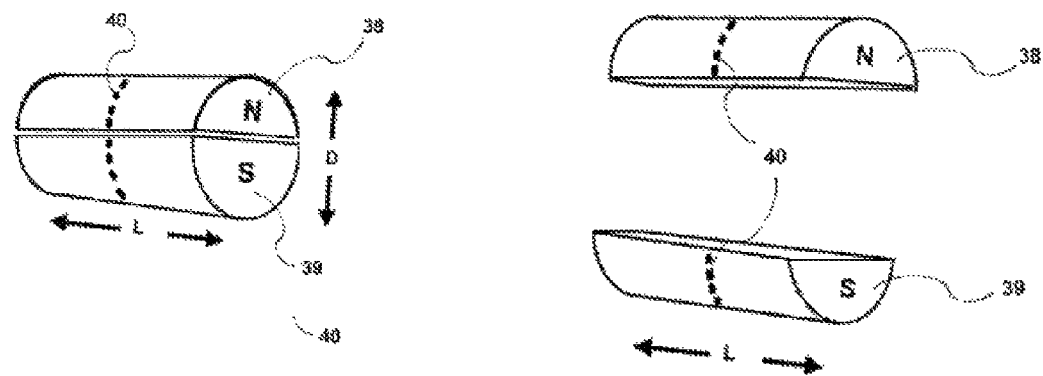
FIG. 5 shows a perspective view and an exploded perspective view of an alternative shape option for the magnet assembly in which the shape of the 2 magnets condense the space requirement of the magnetic assembly. The 2 magnets can also be fused to become a single multi-polar magnet with the same overall shape.

FIG. 5 shows a perspective view and an exploded perspective view of an alternative shape option for the multi-polar magnet assembly. In this case, a metal rod has been dissected laterally so that the end poles form two semi-circles, and each half is magnetised along the long axis, with opposite poles adjacent to each other. When the two halves, 38 and 39, are glued together by means of 2-part epoxy resin or attached by other means, and the flat semi-circular face of one half of the original rod is magnetised with a North pole, and the flat semi-circular face of the other half is magnetised with a South pole, a more compact magnetic assembly is made. The broken lines 40 show a contemplated indent around the circumference of the rod assembly, half way along its length, to provide an advantageous grip into the housing which is shaped accordingly during manufacture.

Figure 6:
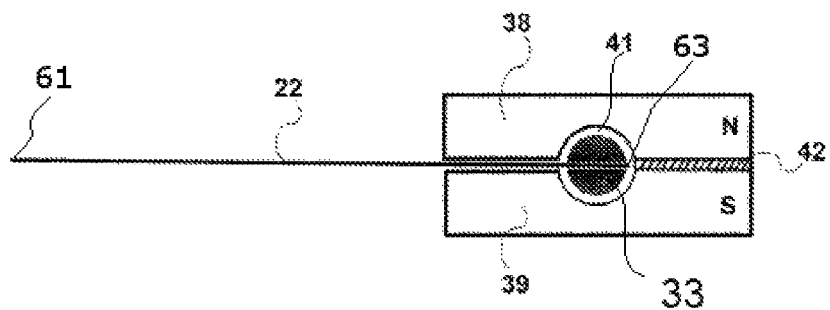
FIG. 6 shows a side view of a related embodiment in which the orienting means of the magnetic assembly is provided by a cavity and hole embedded into the magnet assembly, and into which the filament and plug are inserted.

FIG. 6 shows a side view of a related embodiment in which the two half-magnets 38 and 39 from FIG. 4 contain a spherical cavity 41 within them—each half containing a hemispherical cavity- and a hole joins the cavity to the outside of the assembly and along the long axis of the rod. The filament 22 is attached to the plug 33 inside the cavity, and when the two half magnets are glued together, or otherwise attached as per 42, the magnet assembly will freely rotate about the axis of the filament. Alternatively, the double-half magnets could be replaced by a single horse-shoe-shaped magnet in which both North and South poles are adjacent. This advantageous embodiment obviates the need for a housing for the magnetic assembly, as the shape and construction of the magnet assembly performs the function of the housing. This is a simple and elegant solution, but requires special moulding of the magnets to achieve the required shape. Indeed, the upper North magnet part, and the lower South magnet part, could be a single metal piece which is magnetised in a bi-polar manner along the axis of the rod. In this embodiment, the orienting action is achieved by orienting of the magnet alone. That is, the bi-polar magnet attached to the end of the filament will rotate to align attractively to another bi-polar magnet on the end of a different filament.

Figure 7:
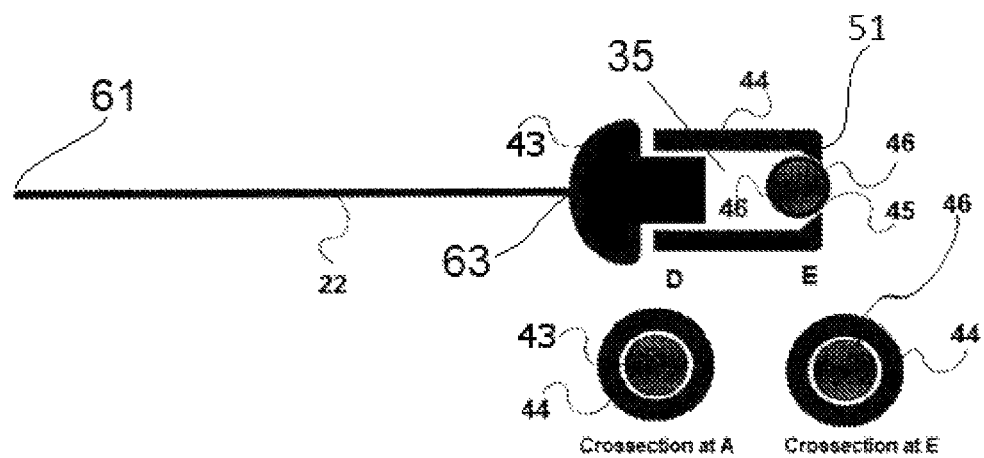
FIG. 7 shows a side view an embodiment in which the orienting means of the magnetic assembly is provided by a single bi-polar magnet orienting inside a chamber within the assembly housing.

FIG. 7 shows a side view an alternative filament embodiment wherein the filament 22 is attached to a larger plug 43 that is in turn rigidly attached to the housing 44. The housing contains a cavity in which a single multipolar magnet, such as a spherical multipolar magnet, which is smaller than the cavity, is accommodated. At the magnet end of the housing is an aperture which is smaller than the magnet, and allows the magnet to protrude to the outside of the housing, so that it can attract and attach to a similarly housed magnet when a corresponding filament is brought close to the enclosed magnet. The aperture and protrusion are advantageous but not necessary, as a stronger magnet might allow sufficient force of attraction through the housing wall to bond with an equivalent magnet in the cavity of a different housing belonging to a different filament. In these embodiments, the orienting action is also achieved by rotation of the magnet alone, whereas the housing remains fixed relative to the filament. That is, the magnet within the housing of one magnetic assembly on the tip of one link, will rotate to align attractively to the magnet within the housing of the other magnetic assembly on the end of a different link.

Figure 8:
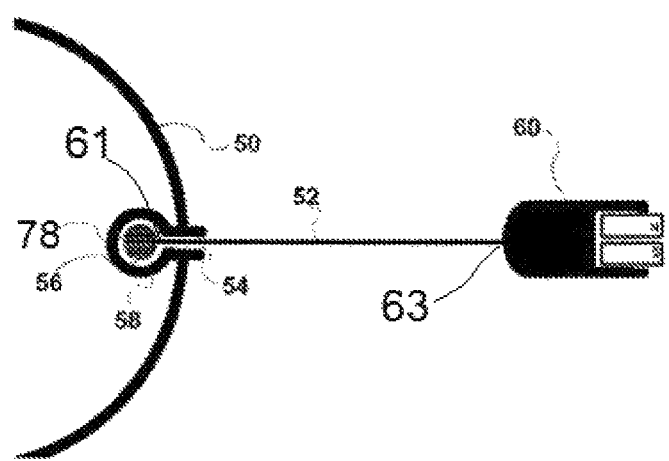
FIG. 8 shows a side view of an alternative embodiment in which the orienting means of the magnetic assembly is provided by the filament rotating inside the atom-model.

FIG. 8 shows a side view of an alternative embodiment of an atom-model 50, as well as an alternative embodiment of a filament, comprising 52 and 56 and 62. In this embodiment, the atom model is a hollow ball made of hard plastic such as ABS plastic, acrylic plastic, metal, cellulose or similar material, wherein the filament 52 is inserted through a small aperture 54 in the wall of the atom-model, and connected to a plug 56. The plug is bigger than the aperture, and is accommodated by a housing 58 comprising a cavity 78 located inside the hollow ball, wherein the cavity is bigger than the plug. The other end of the filament comprises the magnetic assembly 60 which is rigidly attached to the filament. The plug-filament-magnet housing-magnet assembly are all rigidly connected to each other. This configuration allows this plug-filament-magnet housing-magnet assembly to rotate about the filament axis, and magnetically attract, align and stick to a similar plug-filament-magnet housing-magnet assembly of a different atom-model, thereby forming a bond-model between the two atom-models. The ability for the magnetic assembly to orient is provided by the ability of the whole filament to rotate or flex.

Figure 9:
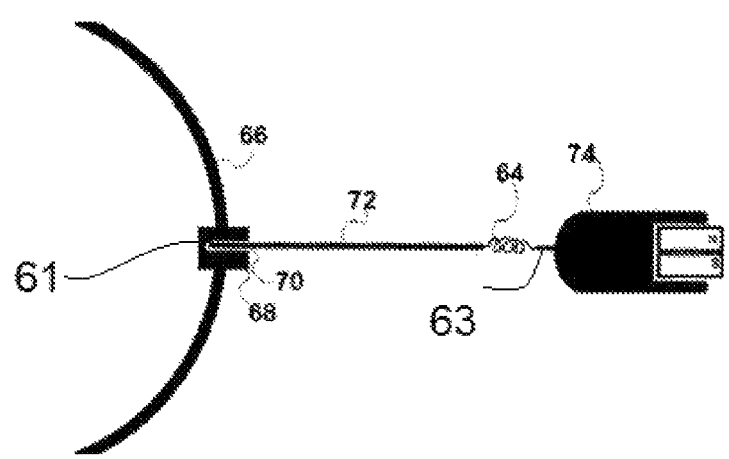
FIG. 9 shows a side view of an embodiment in which the orienting means of the magnetic assembly is provided by a spring that forms part or all of the filament, or by the rotational flexibility or elasticity of the filament material itself.

FIG. 9 shows a side view 65 of an atom-model comprising a hollow sphere 66 made of a hard material such as ABS, acrylic plastic, wood, metal, or similar material, in which a lump 68 is moulded into, or attached to, the wall of the atom-model, and wherein a hole 70 exists in the lump from the atom-model's outside part way through the lump, into which the filament 72 is rigidly attached to the wall of the atom-model, wherein the means of attachment is a 2-pack polyester resin glue or similar. An alternative method of attachment of the filament to the plastic lump could be simultaneous moulding of the lump, and/or atom-model and/or filament. Between the plastic lump and the magnetic assembly 74 is a spring 76 which allows the magnetic assembly to twist about the axis of the filament, and orient constructively with another magnetic assembly at the end of a different filament connected to a different atom-model, so that the two magnetic assemblies attract and connect to each other, thus forming a bond-model between two atom-models. The spring length may form the majority of the length of the filament, or indeed the full length of the filament. That is, the filament may be the spring itself, wherein the spring is directly connected from the atom model to the magnetic assembly. In this configuration, the magnet housing-magnetic assembly are free to rotate about the axis of the filament (or spring) to enable engagement between one filament and another, whereas the lump and filament, if any, remain fixed. This ability for the filament to orient about its own centreline could instead be provided by the flexion of the filament material itself, rather than relying upon a twistable insert in the filament.

Figure 10:
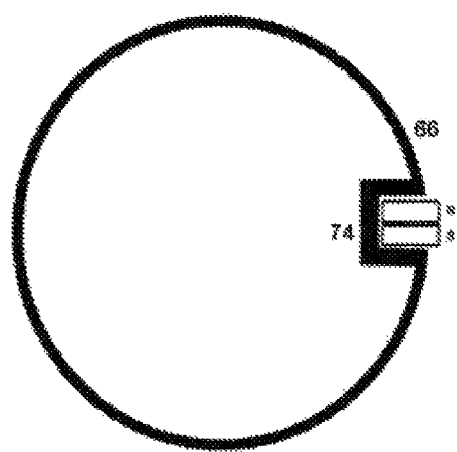
FIG. 10 shows a side view of an atom-model in which the magnets are embedded in the central body itself, and orientation of the magnets is achieved by manual orientation of the atom model, rather than by the filament or by the magnetic assembly. This figure is only applicable in the case of an atom-model requiring a single bond, such as a Hydrogen or Chlorine atom-model. Because these special cases form only one bond with other atom-models, they possess a greater degrees of freedom of orientation than atom-models with two or more bonds.

FIG. 10 shows a side view of an atom-model for the special case of an atom model that requires only one bond, such as a Hydrogen atom model. The multipolar magnets are solidly embedded into the spherical surface of the atom model without need for the assembly to orient or twist. In this case, the magnetic assembly does not need to orient, as this function can be fully achieved by the orientability of a magnetic assembly of a companion multi-bonded atom model; or in the case of bonding with another Hydrogen atom model, by manually orienting the two atoms models in order to magnetically align the atom embedded magnets attractively.

DETAILED DESCRIPTION OF DRAWINGS

FIG. 1
10 Phosphorous atom-model
12 Carbon atom-model
14 Carbon atom-model
16 Oxygen atom-model
18 Carbon atom-model
20 Hydrogen atom-model
22 filament
24 magnetic assembly
20+22+24 Hydrogen atom-model
26 triple bond model
28 filament
29 filament 28+29 single bond model
30 double bond model
FIG. 2
31 aperture
32 magnetic assembly
33 plug
34 rod magnet with N-pole facing out
36 rod magnet with S-pole facing out
37 rod magnet with N-pole facing out
38 rod magnet with S-pole facing out
FIGS. 3 and 4 have the same numbering references as FIG. 2.
FIG. 5
38 top half rod magnet cut along long axis
39 bottom half rod magnet cut along long axis
40 indentation
FIG. 6
41 cavity
42 attachment means (glue), or alternatively elements 38 and 39 are a single magnet with a di-polarity.
FIG. 7
43 plug
44 housing
45 aperture
46 bi-polar ball magnet
FIG. 8
50 hollow ball
52 filament
54 aperture
56 plug
58 plug housing
60 magnet assembly housing
FIG. 9
64 spring
66 atom-model
68 lump (attachment means)
70 hole
72 filament
74 magnet assembly housing
FIG. 10
66 atom-model
74 magnet assembly housing

The invention claimed is:

1. An atomic bonding model for molecular model building, said atomic bonding model comprising,
   a spherical portion,
   at least one flexible filament having a first end attached to said spherical portion and a second end attached to a plug, and
   a housing comprising a) a planar multi-polar magnetic end-face rigidly attached to said housing; b) an aperture smaller than said plug located at the opposite end of said housing from said planar multi-polar magnetic end face wherein said filament passes from the outside to the inside of the housing through said aperture; and c) a cavity wherein said cavity is located between the aperture and said planar multi-polar magnetic end face and is larger than said plug thus allowing said housing to rotate freely around the axis of the filament.

2. An atomic bonding model for molecular model building, said atomic bonding model comprising,
   a spherical portion,
   at least one flexible filament having a first end attached to said spherical portion and a second end attached to a plug,
   a magnetic assembly comprising two magnets joined together arranged to form a planar bi-polar end face capable of magnetically binding to an end-face of another atomic bonding model,
   wherein said two magnets each comprise hemispherical cavities juxtaposed to form a spherical cavity within said magnetic assembly, said cavity joined to the outside of said magnetic assembly by a hole, said filament positioned within said hole and said plug positioned within said spherical cavity such that said magnetic assembly can freely rotate about the axis of said filament.

* * * * *